United States Patent Office 3,166,350
Patented Jan. 19, 1965

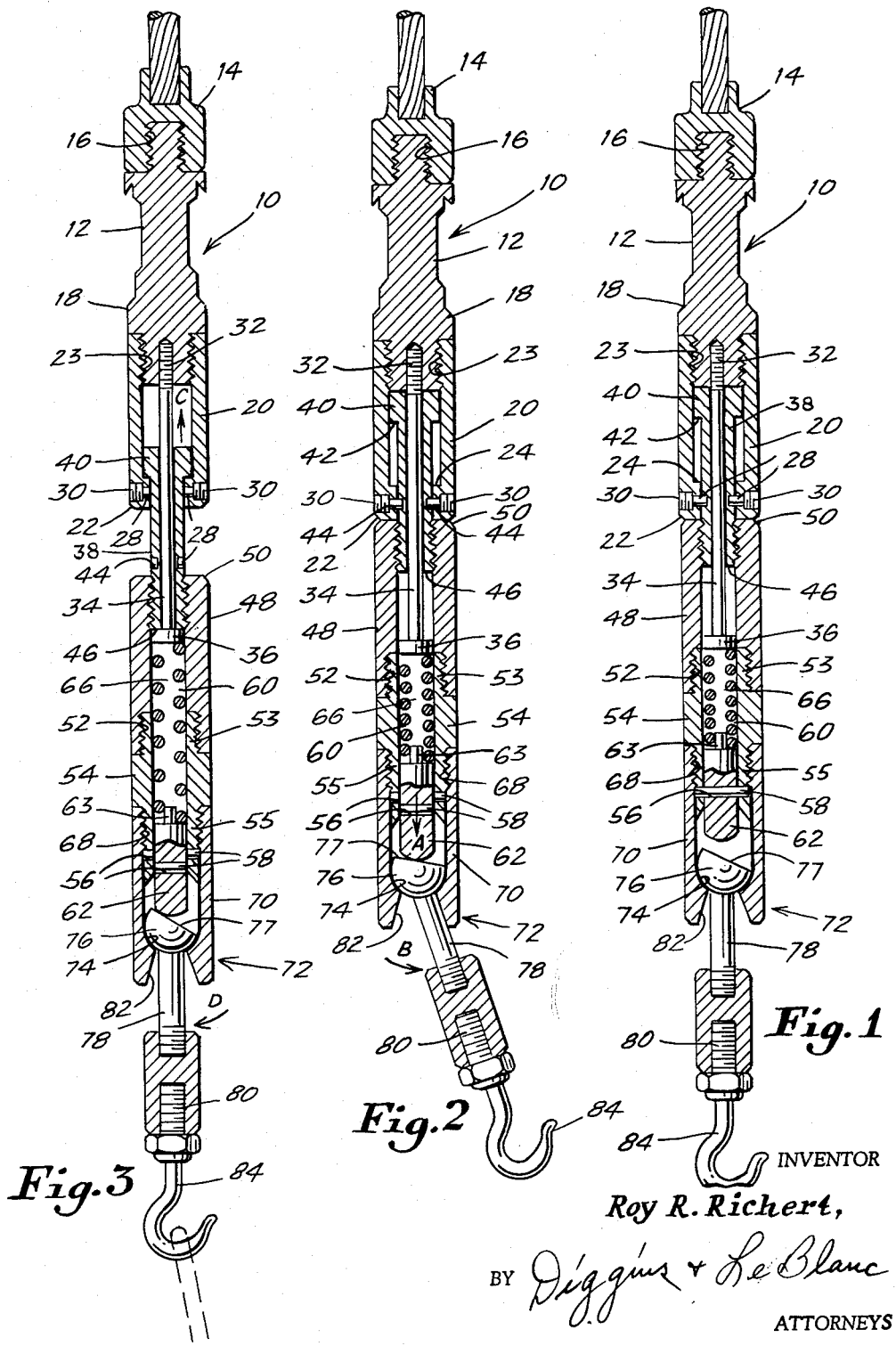

1

3,166,350
KICK-OVER FISHING TOOL
Roy R. Richert, P.O. Box 60, Jennings, La.
Filed Mar. 8, 1962, Ser. No. 178,482
14 Claims. (Cl. 294—86.13)

This invention relates to fishing tool equipment designed to be lowered through a small tubing or casing into a well and more particularly to a kick-over fishing tool of the spring operated type.

During the drilling or operation of wells or bore holes, it often occurs that various tools such as sub-surface instruments, cutting tools, etc. fall into the hole. Often, in the case where the well or hole has been cased, these lost objects fall through a casing or tubing near the top which has a relatively small diameter and eventually come to rest at the bottom of the hole, which normally is cased with a larger tubing, in a leaning position. With this small casing used at the top of the well and with the lost tool or instrument coming to rest in a leaning position, it is practically a necessity that the fishing or grappling tool used to recover it be both extremely small and flexible or bendable so that it can not only pass through the small casing but also align itself with the lost tool, thus permitting the tool to be "fished out" in the most rapid and economical manner.

Various prior workers in the junk fishing tool field have been aware of the desirability of a flexible fishing tool which will tilt over or align itself with a leaning object and have proposed several solutions to the problem. None of these proposed solutions, however, have proved to be very practical and thus have enjoyed a very limited commercial success.

One of the heretofore proposed flexible fishing tools utilized a fishing device having a plunger or piston which tilted over a grappling device through a rack and pinion or gear arrangement. To operate the plunger or piston, the fishing tool was suspended or held by a hollow tube-like operating "string" through which a fluid under pressure was applied to the piston, thus tilting the grappling device. Needless to say, this type fishing tool was rather large, complicated to operate, fragile, susceptible to failure in use, and expensive both to manufacture and use. The use of a hydraulic fluid to operate the fishing tool also required the use of large, heavy, hollow tubing or string which, in turn, required a heavy derrick or drilling rig for proper support plus a hydraulic pumping arrangement. All of this equipment and weight not only resulted in a handling and transportation problem but also increased the number of skilled personnel required for a fishing operation, adding unnecessarily to the cost of operating the device.

A second and somewhat similar approach to retrieving lost objects from a well or hole involves literally washing the object into a basket or catching device by means of a stream of fluid under high pressure. This approach is extremely limited in its use since not only is extremely high pressure equipment required but only a few types of lost objects can be retrieved by this method.

Yet a third type fishing tool, utilizing a leaf-type spring which continually acts to force a grappling tool away from the normal axis of the fishing device, has been proposed. This type fishing tool totally lacks any versatility since the tilting feature is non-controllable, thus materially limiting the use to which it can be put and substantially increasing the handling problem associated therewith both above and below ground.

According to the present invention, it has been found that the above-named difficulties encountered with heretofore known fishing tools can be substantially eliminated by utilizing a kick-over fishing device employing a loaded spring and a pair of shear pins which maintain the spring under compression until the device is to be operated. To tilt over the fishing tool one of the shear pins is sheared, thereby releasing the spring so that it bears upon a knuckle joint which, in turn, moves a grappling tool outward and at an angle to the longitudinal axis of the fishing tool. To again straighten the fishing tool to permit it to be easily withdrawn from a small hole, the second shear pin is sheared, thereby releasing the perssure applied by the spring to the knuckle joint.

Accordingly, the primary object of this invention is to provide a spring operated kick-over type fishing tool.

Another object of this invention is to provide a kick-over fishing tool which is more positive in action, simpler in operation, and less expensive to construct than heretofore known like devices.

Yet another object of this invention is to provide a kick-over fishing tool which requires no special operating or supporting equipment for its proper operation.

Yet still another object of this invention is to provide a kick-over tool which can be placed in a first tilted-over position by a jarring motion.

A further object of this invention is to provide a kick-over fishing tool which can be returned from a tilted position to a straight position by a jerking motion.

Yet a further object of this invention is to provide a kick-over fishing tool which utilizes a spring for tilting over a grappling device.

Yet still a further object of this invention is to provide a kick-over fishing tool which utilizes a plurality of shear pins so that the shearing of one pin serves to tilt a grappling device held by the kick-over tool while the shearing of the second pin serves to straighten the kick-over tool and grappling device.

Another object of this invention is to provide a kick-over fishing tool having a small outer diameter which can be lowered into a cased well by a single or braided cable supporting line.

These and further objects and advantages of the invention will become more apparent upon reference to the following description and claims and the appended drawings wherein:

FIGURE 1 is a vertical, sectional view of the kick-over fishing tool in its loaded and straight position;

FIGURE 2 is a vertical, sectional view of the tool showing the grapple holder in angular relation with the longitudinal axis of the tool; and FIGURE 3 is a vertical, sectional view of the tool showing the grapple holder returned to a straight position for withdrawal from a well or bore hole.

With continuing reference to the accompanying drawings wherein like reference numerals designate similar parts throughout the various views, and with initial attention directed to FIGURE 1, reference numeral 10 is used generally to designate a kick-over fishing tool constructed in accordance with the concept of the present invention. This kick-over fishing tool comprises an end plug 12 adapted to be secured at its upper end to the end of a single strand wire or braided cable drill line 14, the connection being preferably made by suitable, cooperating screw threads 16 on the respective elements. The end plug 12 is enlarged at its lower portion 18 for receiving an upper tubular joint member 20 which preferably has the same outer diameter as the lower portion of the end plug so that a smooth outer housing is formed having no unnecessary projections. The lower portion 18 of the end plug and the upper end of the tubular joint member 20 are joined together by any suitable method such as the cooperating screw threads 23 shown.

The lower end 22 of the tubular joint member 20 is provided internally with a lip which forms a seating surface 24 around the interior of the member. A pair of threaded apertures 26 are provided through this lip and are adapted to receive upward shear pins 28 which are retained in the apertures by threaded Allen plugs 30.

The lower portion 18 of the end plug 12 is also provided with a threaded bore 32 located at its center into which is threaded the upper end of a piston rod 34. The lower end of the piston rod is provided with a piston or plunger 36. A collar or sleeve 38 surrounds the rod 34 so as to provide a slidable passageway through which the rod can move and is provided at its upper end with an enlarged head 40 which forms a seating surface 42 for cooperation with the seating surface 24 of the tubular joint member 20 in a manner that will be more fully explained hereinafter. The collar 38 is provided with a pair of apertures 44 at substantially its middle portion which extend partway through the collar for receiving the upward shear pins 28. With the shear pins located within these apertures, the head 40 of the slidable collar 38 is maintained against the lower portion 18 of the end plug 12 as is clearly seen in FIGURES 1 and 2.

The lower end 46 of the slidable collar 38 is threaded and receives a middle tubular joint member 48 which has the same outer diameter as the tubular joint member 20. The upper end 50 of the member 48 is seated against the lower end 22 of the member 20 so that any downward movement or pressure exerted on the upper member 20 will be transmitted through the middle member 48 to the lower portion of the kick-over fishing tool. The lower end of the member 48 is threadably connected at 52 over a reduced diameter threaded portion 53 of a lower tubular member 54.

The lower tubular member 54 has a second reduced diameter threaded portion 55 which is provided with a pair of apertures 56 that are aligned with one another for receiving a downward shear pin 58 which is positioned as shown in FIGURE 1. Positioned within the chamber 60 formed within the threaded member 54 is a piston or plunger 62 which is provided with a hole 56 through which the shear pin 58 passes so that the piston is normally held in the position shown in FIGURE 1. Located below the upper end 63 of the piston 62 and the lower face of the piston 36 is a coil spring 66 which is maintained in a compressed state by the shear pins 28 and 58 holding the pistons 36 and 62, respectively, in the position shown in FIGURE 1.

The lower reduced diameter threaded portion 55 of the tubular member 54 is shown threadably connected at 68 to the upper portion 70 of a ball and socket or knuckle joint shown generally at 72. The lower interior portion 74 of this socket member is spherically formed to securely enclose and hold a ball member 76 which forms the upper portion of a shaft 78 to the lower end of which a fishing or grappling tool 84 of any desired type may be attached through the threaded coupling 80.

As can be seen in the various figures, a portion of the ball member 76 has been removed so as to form a plane, canted surface 77 which is at an acute angle in relationship to the longitudinal axis of the shaft 78 and kick-over fishing tool 10. In order that the shaft 78 may assume a desired flexible angle with respect to the axis of the kick-over fishing tool, the axial bore through the lower socket member 74 is given a conical shape, as shown at 82.

The operation of the kick-over fishing tool may be explained in substantially the following manner:

Assume that a lost tool, such as a sub-surface instrument, has fallen through a small tubing in a well bore and is leaned over in a large pipe at the bottom of the bore. A suitable fishing or grappling tool 84 for retrieving the lost instrument or tool is threaded into the coupling 80 of the kick-over fishing tool shown in FIGURE 1 and this loaded fishing tool is then connected to a single strand wire or braided cable such as shown at 14. The kick-over fishing tool is now ready to be lowered by the wire or cable down through the smaller tubing in the top of the cased bore until the tool reaches the larger type of casing at the bottom where the lost instrument or tool is lodged. Assuming that the over-all outside diameter of the kick-over tool is approximately one and three-quarters inches and its length about 20 inches (dimensions which appropriately may be selected for the fishing tool of the present invention) the tool can pass through this smaller tubing used in casing the upper portion of a bore hole with no difficulty whatsoever.

When the kick-over fishing tool is finally lowered so that it is positioned just above or beside the lost tool or instrument, the fishing tool will be in the extended position shown in FIGURE 1. It is now desirable to "tilt" the grappling tool carried by the coupling 80 so that it can engage the lost tool or instrument. This tilting or kicking-over of the grappling tool is accomplished by subjecting the kick-over fishing tool to a sudden downward jar, such as is produced by dropping the tool against the lost instrument or bottom of the bore hole, which when added to the existing pressure exerted by the compressed coil spring 66, is sufficient to shear the downward shear pin 58. With the pin 58 sheared, the compressed coil spring 66 will drive the piston 62 longitudinally downward as indicated by the arrow A in FIGURE 2 into engagement against the angled surface 77, thereby kicking the shaft 78 to the right as indicated by the arrow B.

Since the slidable collar 38 is threadably secured to member 48 and the member 20 butts securely against member 48, the upward shear pins 28 will not be affected by the downward force utilized to shear the pin 58. With the shaft 78 to the right, the kick-over fishing tool is now ready to be manipulated in a manner well known in the grappling art until the grappling device engages with and is secured to the lost instrument or tool at which time the kick-over fishing tool and lost instrument are ready to be returned to the surface.

As can be seen in FIGURE 2, it would be impossible to withdraw the kick-over fishing tool 10 in its tilted condition through the small tubing in the well bore since the outer diameter of the combined tool and lost instrument in this position would be too great. Thus, it is necessary that the kick-over fishing tool be returned to a straightened position similar to that in which it was in prior to being lowered into the well bore. This straightening out of the tool is accomplished by subjecting the fishing tool to a sudden sharp upward jerk, such as is produced by jerking the cable 14 upward, which is sufficient to shear the upward shear pins 28.

With the pins 28 sheared, the end plug 12 and tubular joint member 20 are free to longitudinally slide upward along the outer surface of the collar 38 until the seating surface 24 of the member 20 engages and seats against the seating surface 42 of the collar 38. Since the piston rod 34 is secured to the end plug 12, the rod will also be moved upward through the passageway of the collar 38 as indicated by the arrow C of FIGURE 3, thereby releasing the tension exerted by the piston 36 on the coil spring 66. With the coil spring 66 no longer in a compressed state and thus no longer exerting a downward force upon the piston 62, the shaft 78 will move by gravity to the left as indicated by the arrow D and the complete fishing tool will assume the position shown in FIGURE 3. The kick-over fishing tool and the lost instrument or tool connected thereto can now be withdrawn through the small tubing in the bore hole.

To reload the kick-over fishing tool so that it may again be used it is only necessary to unscrew the ball and socket or knuckle joint 72 from the tubular member 54. The piston 62, coil spring 66 and piston 36 will now move downwardly until the apertures 26 of the member 20 are aligned with the apertures 44 in the collar 38. The old upward shear pins 28 are now removed by taking out the Allen plugs 30 and new shear pins are inserted. The Allen plugs are now rethreaded into the apertures 26. The piston 62 is now pressed upward against the spring 66 until apertures 56 of the member 54 are aligned with the aperture 64 in the piston. A new downward shear pin 58 is then inserted into the aperture thereby ejecting the old pin and locking the piston in its loaded position. The ball and socket joint 72 is now rethreaded onto the member 54 thus completing the reloading of the kick-over fishing tool. Obviously this reloading could be accomplished by unscrewing various other members if such were desirable.

Although the novel features of this invention have been disclosed in connection with a fishing tool, it is to be realized that the principles of this invention can be incorporated in various other tools. For example, this invention could also be used for drilling or surveying various types of bore holes.

It will be apparent from the foregoing that the kick-over fishing tool of this invention is extremely rugged, compact and will be both inexpensive to manufacture and use. Due to the small size and light weight of the fishing tool it can be used where other prior known fishing devices would not fit and does not require that a special drilling derrick be set up over the bore well. The expensive tubing or piping and the associated hydraulic pumping system heretofore thought necessary to operate a fishing device properly has also been completely eliminated, thus substantially reducing the number of personnel necessary to operate the device, the amount of equipment required and the set-up time involved. The unique operation of the kick-over fishing tool also permits the tool to be tilted or kicked over when desired, the fishing step accomplished and the tool then straightened for easy withdrawal from the bore well. All of these above characteristics are highly desirable for a bore well fishing device.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a well fishing tool apparatus, an assembly comprising a housing, spring means located in said housing, first and second releasable means associated with said spring means for maintaining said spring means in a compressed state, universal joint means located within said housing, means connecting said spring means to said universal joint means, said first releasable means being operable to deflect said universal joint means at an angle with respect to said housing means when said housing means is jarred, said second releasable means being operable when said housing means is jerked in a direction away from said universal joint means to release said compressed spring for returning said universal joint means to its normal undeflected position.

2. In a well fishing tool apparatus according to claim 1 wherein said first and second releasable means are shear pins.

3. In a well fishing tool apparatus, an assembly comprising a housing, a spring means located within said housing, a first shear pin associated with one end of said spring means, a second shear pin associated with the other end of said spring means, said first and second shear pins normally maintaining said spring means in a compressed state, a universal joint mounted in said housing, plunger means carried by said spring means for engaging and tilting said universal joint at an angle with respect to said housing when said first shear pin is sheared, means for shearing said first pin to release said one end of said spring to tilt said universal joint, and means for shearing said second shear pin to release said compressed spring to return said universal joint to its initial position.

4. An apparatus for use in wells comprising housing means including a first and second tubular means, end means mounted to one end of said first tubular means for connecting said apparatus to a supporting means, rod means secured to said end means and mounted in said first tubular means, means for securing said second tubular means to the other end of said first tubular means, joint means mounted in the other end of said second tubular means, said joint means including operating means for deflecting said joint means at an angle to said housing means when acted upon by a drive means, drive means mounted in said second tubular means between said rod means and said operating means, and first releasable means mounted in said second tubular means for maintaining said drive means in an inoperative condition, said first releasable means being actuatable by a jarring motion on said apparatus to release said drive means whereby said drive means acts upon said operating means to deflect said joint means, said means for securing said second tubular means to the other end of said first tubular means being a slidable collar means mounted on said rod means, said collar means including second releasable means for holding said driving means against said operating means, said second releasable means being actuatable by a jerking motion on said apparatus to stop said drive means from acting on said operating means whereby said joint means is returned to its original position.

5. An apparatus according to claim 4 wherein said first and said second releasable means for shear means.

6. An apparatus for use in wells comprising housing means including a first tubular element, socket means formed in one end of said tubular element, ball means having a canted surface rotatably mounted in said socket means, shaft means extending through said one end of said first tubular element and connected to said ball means, sleeve means secured to the other end of said first tubular element, rod means mounted in said sleeve means, spring means positioned in said first tubular element and against one end of said rod, piston means mounted on the other end of said spring means for engaging against and moving said canted surface into alignment with the face of said piston means, releasable means for maintaining said piston means out of flush contact with said canted surface, said releasable means maintaining said spring means in a compressed state, and supporting means including a second tubular element secured to said other end of said first tubular element for jarring said releasable means in a downward direction, said releasable means being released by said jarring so that said piston engages said canted surface through the downward pressure of said compressed spring means thereby deflecting said canted surface and said shaft means at an angle with respect to said housing means.

7. An apparatus according to claim 6 wherein said second tubular element is slidably mounted around said sleeve, additional releasable means connected between said second tubular element and said sleeve for maintaining said tubular element and said sleeve in a first position, means securing the other end of said rod to said second tubular element so that an upward jerk on said supporting means releases said additional releasable means thereby permitting said second tubular element to slide along said sleeve until said one end of said rod is moved to release said compressed spring means.

8. A fishing tool for use in wells comprising a housing, said housing including a first tubular element, a socket joint mounted in one end of said tubular element, ball means mounted in said socket joint, a shaft secured to said ball means and extending through said one end of said tubular element, coupling means secured to said shaft for receiving a grappling tool, said ball means having a plane surface at an acute angle with respect to said shaft, a hollow sleeve secured to the other end of said first tubular element, a rod having a piston head on one end thereof slidably positioned in said hollow sleeve, a coil spring having one end thereof engaging said piston head, a piston mounted on the other end of said coil spring, an aperture passing through said piston and into said first tubular element, a first shear pin positioned in said aperture for holding said piston out of flush contact with said plane surface and said coil spring in a compressed condition, a second tubular element slidably mounted around said hollow sleeve, an end plug mounted in the end of said second tubular element, cable means secured to said end plug for supporting and operating said fishing tool, means securing the other end of said rod to said end plug, a first and second aperture extending through said second tubular element and mating with a pair of recesses in said hollow sleeve, and second shear pins extending through said apertures into said recesses for connecting said second tubular element to said hollow sleeve, said first shear pin being sheared when said fishing tool is subjected to a jarring force through operation of said cable means so that said piston is forced against said plane surface thereby deflecting said shaft at an angle with respect to said housing, said second shear pins being sheared when said fishing tool is subjected to a jerking force through operation of said cable means, said piston head being released by the shearing of said second shear pins so that said coil spring is released and said piston is pulled up thereby permitting said shaft to return to its original position.

9. A fishing tool according to claim 8 wherein said second shear pins are held in place by removable means.

10. An apparatus comprising a laterally tiltable tool, means for connecting said tool to the lower end of a supporting cable, biased spring means coupled to said connecting means and arranged to move and hold said tool in a tilted position, retaining means associated with the ends of the spring means holding the spring means in an energy stored condition, and impact responsive means arranged to release said retaining means at one end of said spring means upon the application of an impact force on the free end of said tool whereby said spring means acts to move and hold said tool in a tilted position.

11. An apparatus comprising a laterally tiltable tool movable from an untilted to a tilted position, means for connecting said tool to the lower end of a supporting cable, compressed spring means coupled to said connecting means and arranged to move and hold said tool in said tilted position, impact responsive means arranged so that it will release the spring means for partial expansion on the application of an impact force on the free end of said tool whereby said spring means acts to move and hold said tool in said tilted position, and means responsive to a jerk on said cable permitting complete expansion of said spring means whereby said tool is free to return to said untilted position.

12. An apparatus comprising a fishing tool, tilt over means including a ball and socket for connecting said fishing tool to the lower end of a supporting cable, compressed spring means carried by said tilt over means, retaining means associated with the ends of the spring means holding the spring means in an energy stored condition, and impact responsive means coupled to one end of such retaining means and arranged to release said retaining means at one end of said spring means upon the application of an impact force on the free end of said tool, said one end of said spring means acting on said ball to tilt and hold said fishing tool in a tilted over position when it is released.

13. An apparatus comprising a fishing tool, movable from an untilted to a tilted position, tilt over means including a ball and socket for connecting said fishing tool to the lower end of a supporting cable, compressed spring means carried by said tilt over means, retaining means associated with the ends of the spring means holding the spring means in an energy stored condition, impact responsive means arranged to release said retaining means at one end of said spring means to permit partial expansion of said spring means upon the application of an impact force on the free end of said tool, said one end of said spring means when released acting on said ball to tilt and hold said fishing tool in said tilted position, and means associated with said retaining means at the opposite end of said spring means being responsive to a jerk on said cable to release the other end of said spring means permitting complete expansion of said spring means whereby said tool is free to return to said untilted position.

14. An apparatus according to claim 13 wherein said impact and jerk responsive means are both frangible.

References Cited in the file of this patent
UNITED STATES PATENTS

| | | |
|---|---|---|
| 1,738,819 | Cormier | Dec. 10, 1929 |
| 1,908,174 | O'Grady | May 9, 1933 |
| 2,697,001 | McGraw | Dec. 14, 1954 |
| 2,872,238 | Daffin | Feb. 3, 1959 |